US010960297B2

(12) United States Patent
Chapman

(10) Patent No.: US 10,960,297 B2
(45) Date of Patent: Mar. 30, 2021

(54) SYSTEMS AND METHODS FOR TRACKING A PHYSICAL OBJECT USING A PASSIVE OBJECT HAVING A REFLECTIVE SURFACE

(71) Applicant: Disney Enterprises, Inc., Burbank, CA (US)

(72) Inventor: Steven M. Chapman, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 61 days.

(21) Appl. No.: 16/133,597

(22) Filed: Sep. 17, 2018

(65) Prior Publication Data

US 2020/0086208 A1 Mar. 19, 2020

(51) Int. Cl.
| A63F 13/213 | (2014.01) |
| G06T 7/73 | (2017.01) |
| G06T 7/246 | (2017.01) |
| H04N 5/232 | (2006.01) |
| A63F 13/25 | (2014.01) |
| G06T 7/80 | (2017.01) |

(52) U.S. Cl.
CPC ............ *A63F 13/213* (2014.09); *A63F 13/25* (2014.09); *G06T 7/246* (2017.01); *G06T 7/73* (2017.01); *G06T 7/80* (2017.01); *H04N 5/232* (2013.01); *A63F 2300/8082* (2013.01); *G06T 2207/20164* (2013.01)

(58) Field of Classification Search
CPC .................. A63F 13/213; A63F 13/25; A63F 2300/8082; G06T 7/80; G06T 7/246; G06T 7/73; G06T 2207/20164; H04N 5/232

USPC .......................................................... 348/169
See application file for complete search history.

(56) References Cited

U.S. PATENT DOCUMENTS

| 2006/0028474 | A1* | 2/2006 | Pfister | G06T 13/20 |
| | | | | 345/473 |
| 2011/0069299 | A1* | 3/2011 | Hsu | G01C 3/08 |
| | | | | 356/4.02 |
| 2012/0276997 | A1* | 11/2012 | Chowdhary | A63F 13/69 |
| | | | | 463/31 |
| 2013/0050426 | A1* | 2/2013 | Sarmast | G06T 7/521 |
| | | | | 348/46 |
| 2014/0267412 | A1* | 9/2014 | Calian | G06T 15/04 |
| | | | | 345/633 |
| 2016/0262913 | A1* | 9/2016 | Kling | A61B 90/39 |
| 2017/0221224 | A1* | 8/2017 | Domae | G06T 7/74 |
| 2017/0352184 | A1* | 12/2017 | Poulos | G06T 19/006 |

* cited by examiner

*Primary Examiner* — Dakshesh D Parikh
(74) *Attorney, Agent, or Firm* — Dorsey & Whitney LLP

(57) ABSTRACT

Systems, methods, and devices are disclosed for tracking physical objects using a passive reflective object. A computer-implemented method includes obtaining a location profile derived from content capturing a passive object having a reflective surface reflecting one or more real-world objects. The passive object is attached to a physical object. The method further includes transmitting the location profile to a simulation device. The method further includes generating a virtual representation of the physical object based on the location profile of the passive object. The method further includes presenting the virtual representation in a simulation experience.

19 Claims, 6 Drawing Sheets

SYSTEMS AND METHODS FOR TRACKING A PHYSICAL OBJECT USING A PASSIVE OBJECT HAVING A REFLECTIVE SURFACE

TECHNICAL FIELD

The present disclosure relates generally to simulated experiences, such as that experienced in gaming environments and augmented reality (AR)/virtual reality (VR) environments.

BRIEF SUMMARY OF THE DISCLOSURE

Embodiments of the present disclosure include systems, methods, and devices capable of tracking the location of a physical object using a passive reflective surface to display in a virtual environments such as augmented reality (AR)/virtual reality (VR).

In accordance with the technology described herein, a method for tracking physical objects using a passive reflective surface is disclosed. The computer-implemented method includes obtaining a location profile derived from content capturing a passive object having a reflective surface reflecting one or more real-world objects. The passive object is attached to a physical object. The method further includes transmitting the location profile to a simulation device. The further method includes generating a virtual representation of the physical object based on the location profile of the passive object. The method further includes presenting the virtual representation in a simulation experience.

In embodiments, the passive object includes a pattern to improve the location profile.

In embodiments, the pattern is a set of etched parallel lines on the passive object.

In embodiments, the location profile includes a position and an orientation of the passive object in the real-world environment.

In embodiments, obtaining a location profile derived from content further includes detecting the one or more real-world objects reflected in the passive object. The location profile derived from content further includes generating vectors from the passive object to the one or more real-world objects.

In embodiments, the vector includes a Rodrigues' vector.

In embodiments, the camera is integrated into the simulation device.

In embodiments, the passive object is a spheroid.

In embodiments, the simulation experience includes at least one of an augmented reality (AR), virtual reality (VR), motion capture performance, and gaming experience.

In embodiments, the method may include obtaining a second location profile of the passive object. The second location profile includes a second position and a second orientation. The method may further include transmitting the second location profile to the simulation device. The method may further include presenting the virtual object in a second location in the simulation experience based on the second location profile.

In accordance with additional aspects of the present disclosure, a system includes a camera. A system further includes a simulation device operatively connected to the camera. The simulation device may present a virtual representation of a physical object with an attached passive object having a reflective surface based on a location profile derived from content captured by the camera of one or more objects reflected off the passive object. The simulation device presents a dynamically moving virtual representation of the physical object associated with movement of the physical object in a simulation experience.

In embodiments, the passive object includes a mark associated with one or more changes to the simulation experience.

In embodiments, the mark is one or more of a barcode, QR code, UPC code, and serial number.

In embodiments, the one or more changes includes one or more of a virtual representation of the physical object, an additional simulation experience, an additional simulation event occurrence, and an additional virtual representation of a character in the simulation device.

In embodiments, the location profile includes a location and orientation of the passive object at a time.

In embodiments, the passive object is a spheroid and includes a pattern. The pattern may be a set of etched lines on the passive object running from a first pole of the passive object to a second pole of the passive object.

In embodiments, the simulation device further includes a lighting device in a fixed location in a real-world environment. The lighting device may be captured by the camera as a reflection in the passive object to calibrate the location profile by using a known location of the lighting device.

In accordance with additional aspects of the present disclosure, a computer-implemented method includes receiving content captured by a camera of a passive object having a reflective surface reflecting one or more real-world objects. The computer-implemented method further includes generating a location profile of the passive object attached to a physical object. The location profile includes a location and orientation of a passive object. The computer-implemented method further includes generating a location of a virtual representation of the physical object in the simulation experience. The computer-implemented method further includes presenting the simulation experience with the virtual representation in a virtual location.

In embodiments, generating a location profile of the passive object includes detecting the one or more real-world objects reflected in the passive object. Generating a location profile of the passive object further includes generating vectors from the passive object to the one or more real-world objects.

In embodiments, detecting the one or more real world objects includes one or more of centroid detection and corner detection.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
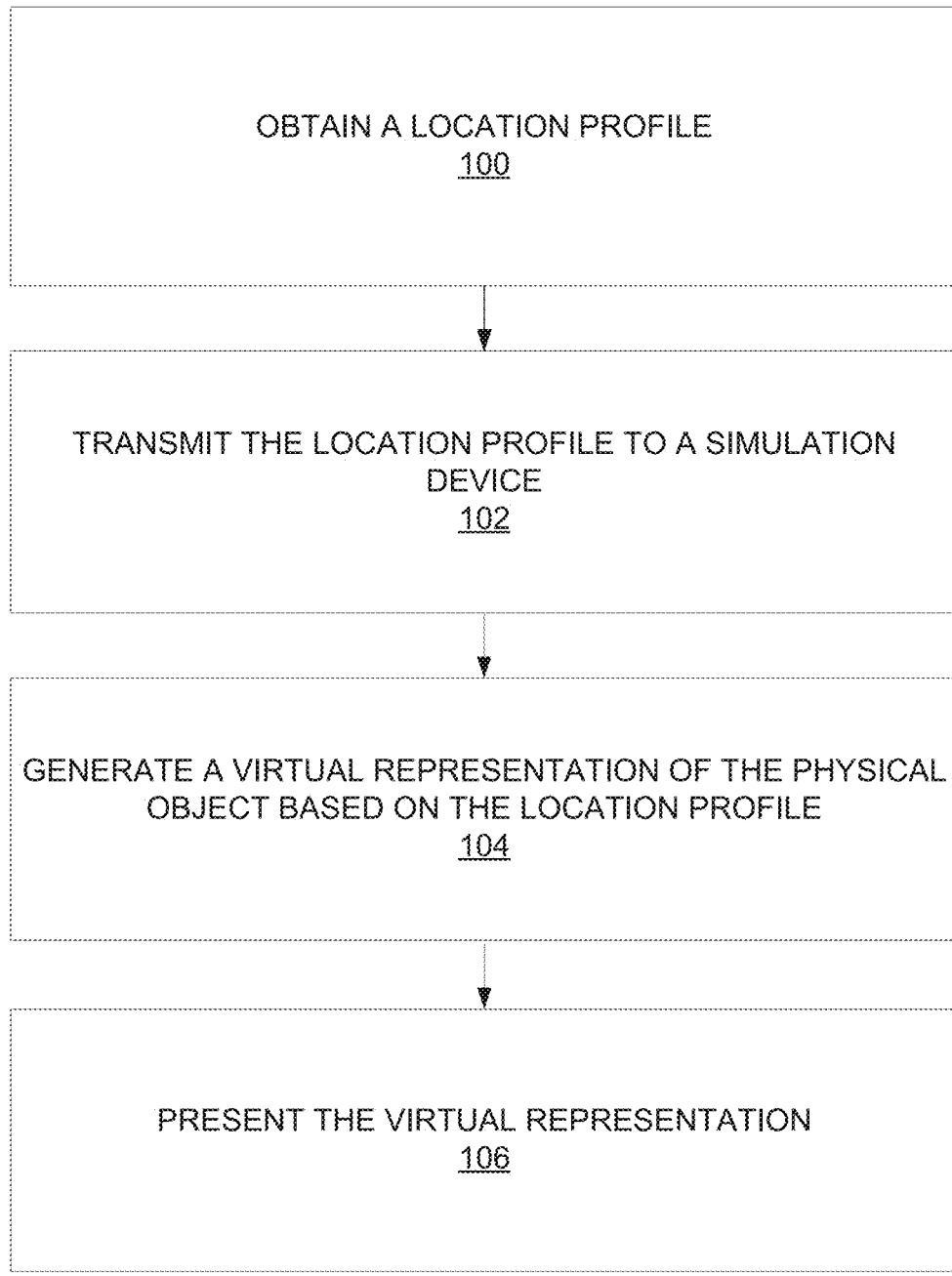
FIG. 1 is an operational flow diagram illustrating an example process for providing a simulation experience with physical objects attached to passive objects having reflective surfaces in accordance with one embodiment.

The figures are not exhaustive and do not limit the present disclosure to the precise form disclosed.

DETAILED DESCRIPTION

Systems that provide or generate simulated environments often rely on embedded electronics to incorporate and track real-world objects in those simulated environments. For example, some conventional simulation environments rely on purely virtual objects generated by simulation devices. Some conventional simulation environments can include virtual objects that are generated based on real-world objects having embedded electronics. Other simulation environments may use laser and radio technology to track real-world objects for use as virtual objects in the simulation environments. For example, a real-world object having embedded electronics may communicate with a simulation device or network to associate that real-world object with a virtual object in a simulation environment. Such communications may involve the embedded electronics sending electronic signals about the real-world object's position. In this way, movement of and/or actions involving the real-world object in the real-world correspond to movement and/or actions in the simulation environment.

For example, a simulation experience may include VR, AR, or other virtual experiences. VR can refer to the creation of a fully immersive virtual world/space experience with which users may interact. AR can refer to the blending of VR elements and real life. For example, AR may involve providing a live, displayed experience of a physical, real-world environment in which the real-world elements are augmented or replaced by computer-generated images, video, or text. Still, other environments, such as that created in a video game, can involve simulating player interaction(s) within the gaming environment.

Accordingly, various embodiments of the present disclosure are directed to a device, apparatus, or other passive object 204 having a reflective surface (FIG. 2A) that can be attached to a (real-world) physical object 202. The passive object 204 allows a user to interact with or engage in a simulation experience within a simulation environment using that actual, physical object 202. In some embodiments, passive object 204 is a spheroid. It should be appreciated that passive object 204 could be other shapes. In some embodiments, the reflections reflected off passive object 204 may be captured by camera 205. The captured reflection may be used to generate a location profile that can be relayed to a simulation device or system 206 (either directly or indirectly through network 212) such that movement of the physical object 202 can be accurately represented and tracked in the simulation environment. In some embodiments, the location profile of the physical object 202 may be improved by patterns on passive object 204.

As used herein, the term physical object can refer to a real-world analog used to interact with or interact in a simulated environment, such as a gaming environment, an AR/VR experience, and the like. It is distinguished from dedicated controllers and other objects with embedded electronics that are used for controlling or interacting within a simulated experience or environment. For example, a user may use a pencil to simulate a wand in a simulated game generated or presented by a gaming system.

FIG. 1 is an operational flow diagram illustrating an example process for providing a simulation experience that utilizes physical objects having passive objects attached in accordance with one embodiment. The operations of the various methods described herein are not necessarily limited to the order described or shown in the figures, and one of skill in the art will appreciate, upon studying the present disclosure, variations of the order of the operations described herein that are within the spirit and scope of the disclosure.

The operations and sub-operations of the flow diagram may be carried out, in some cases, by one or more of the components, elements, devices, components, and circuitry of system 200. This may include one or more of: camera 205; simulation device 206 (including the corresponding components of simulation device 206); network 212; server system 214; server 216; processor 220; database 218; presentation output device 210; display 208; speakers 209; and/or computing component 500, described herein and referenced with respect to at least FIGS. 2A, 2B, and 5, as well as subcomponents, elements, devices, components, and circuitry depicted therein and/or described with respect thereto. In such instances, the description of the flow diagram may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-) components, elements, devices, circuitry, etc., including variations thereof, may be applied to the various operations described in connection with the flow diagram without departing from the scope of the present disclosure.

At operation 100, a location profile including a three-dimensional position of passive object 204 and an orientation or direction of passive object 204 is obtained. In embodiments, the location profile may be derived from objects reflected off passive object 204. For example, camera 205 may capture a video or images of passive object 204 (e.g., a spheroid). Passive object 204 may be reflecting spheroid representations of one or more objects in the real-world environment. In embodiments, corner detection, centroid detection, and/or other object recognition techniques may be used to detect the one or more objects captured in the spheroid representation. A vector, one example of a location profile, may be generated from the center of the passive object to a center of the one or more detected objects in the real-world environment. In some embodiments, the vector may be a Rodrigues' vector, a vector describing the three-dimensional position, an axis around which rotation occurs, and an angle of rotation of an object (e.g., passive object 204). The magnitude of the Rodrigues' vector may be the tangent of half the angle of rotation. In some embodiments, other location information (e.g., time, position, etc.) may be obtained to determine the location and rotation of passive object 204.

Camera 205 may be stationary (e.g., fixed above or around the user, or otherwise capturing the real-world environment). In some embodiments, camera 205 may be mobile (e.g., attached to a user, integrated into an AR/VR headset, etc.). In some embodiments, camera 205 may be a 360 degree camera, a webcam, a video camera, a phone camera, and/or other type or form of camera. In some embodiments, there may be more than one camera.

In some embodiments, passive object 204 may be attached to physical object 202. This allows the physical object 202 to be incorporated into the simulation environment and experiences. For example, passive object 204 may be attached to physical objects using adhesives, Velcro® straps, buckles, mounts, and/or other attachment mechanisms. In one example, the physical object 202 may be a collectible associated with the simulation experience, such as a laser gun from a sci-fi game. The laser gun may be configured to receive passive object 204. Passive object 204 may have a mark that is optically capturable that includes information associated with the simulation experience.

Passive object 204 may include patterns to improve the accuracy of the location profile. For example, the patterns may be etched lines that mark axes of the physical object 202. It should be appreciated that other patterns may be used (e.g., parallel lines, orthogonally intersecting lines, curved lines that meet at the poles of passive object 204 like longitudinal lines, etc.), and other methods may be used to make the patterns (e.g., tape, paint, etc.). In embodiments, the location profile may also be improved by using supplemental lighting in the real-world environment to help calibrate the location profile based on a permanent known position. For example, a flashing LED may be positioned in a real-world environment. Based on the length of time between flashes of the LED, the flashing LED may be used as a calibration mechanism of a known position in the real-world environment.

In embodiments, passive object 204 may include an optically capturable mark (not shown) that associates passive object 204 with changes in a simulation experience. It should be appreciated, that there may be more than one mark on passive object 204 for multiple changes in a simulation experience. For example, the optically capturable mark may have a universal product code (UPC), a serial number, barcode, a model number, a QR code, or other identifier which a user may scan with a device, such as a smart phone or camera 205. The scanning device can obtain a profile associated with the physical object 202 from local memory, simulation device 206, and/or the server system 214. The scanning device may transmit the profile to passive object 204 using wireless communications via Bluetooth, Wi-Fi, infrared communications, Near Field Communications (NFC), for example, or through a wired connection, such as via Universal Serial Bus (USB). The optically capturable mark may be etched into or otherwise integrated into passive object 204.

For example, the profile may be transmitted to a personal computing device, such as a PC, a smart phone, a tablet, a dedicated configuration device, a gaming console, a simulation device (discussed in greater detail below), or similar device. When scanned and captured, the mark may be associated with an upgraded item, provide a new simulation experience, unlock a new character, and/or present other changes reflected in the simulation environment. In embodiments, passive object 204 can have one or more marks for one or more changes. A particular profile associated with a mark can be selected by interacting with the personal computing device.

Figure 2A:
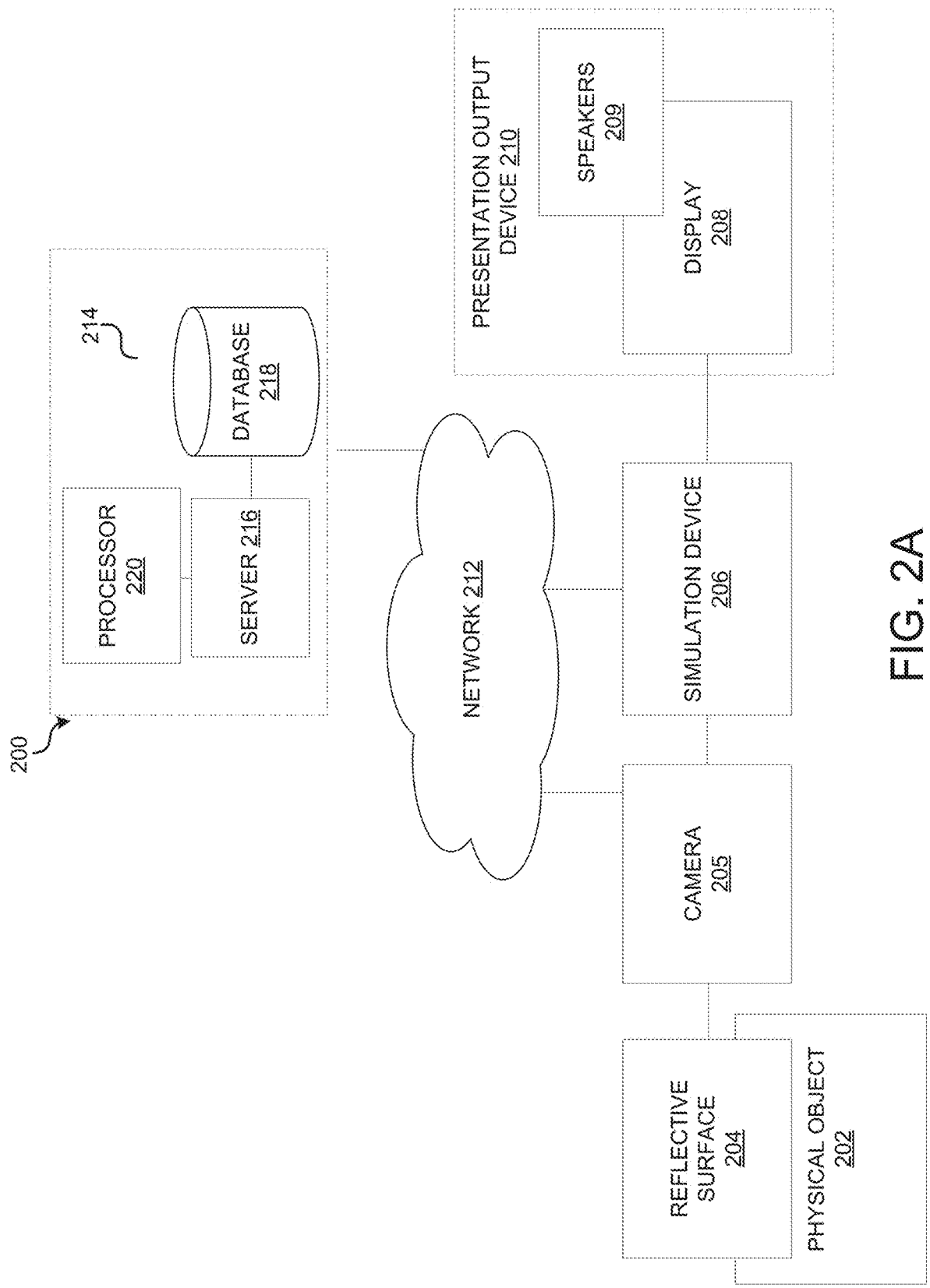
FIG. 2A illustrates an example system for providing a simulation experience using physical objects having attached passive objects in accordance with various embodiments.

FIG. 2A illustrates an example system in which various embodiments may be implemented. One or more location profiles may be obtained from server system 214 or simulation device 206 that has processed the video or images from camera 205 of passive object 204, as described above. Server system 214 may include a server 216, a database 218, and a processor 220 from which location profiles can be obtained via network 212. As will be appreciated, the server 216, the database 218, and the processor 220 may be communicative coupled to transmit signals and/or information within the server system. In some embodiments, simulation device 206 and/or server system 214 may transmit a location profile that includes the minimum requirements to determine the location of passive object 204 to improve processing times.

Network 212 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 212 may employ various communication media, such as a coaxial cable, fiber optic cable system, Ethernet, radio waves, etc. Further still, network 212 may be one or more combinations of any of the aforementioned networks.

At operation 102, the location profile obtained from the passive object may be transmitted to a simulation device. Referring again to FIG. 2A, simulation device 206 may be a set top box, a gaming console, or in some embodiments, may be part of a TV, monitor, head-mounted display (HMD) device, or some similar device. Transmission of the location profile can occur wirelessly via Bluetooth, Wi-Fi, infrared communications, NFC, for example, or through a wired connection, such as via USB. In this way, simulation device 206 can be apprised of where physical object 202, that is to be used for interaction with or in a simulation environment generated by simulation device 206, is located in the real-world environment to inform the simulation environment.

At operation 104, a virtual representation of the physical object may be generated based on the location profile of the passive object. Passive object 204 and simulation device 206 may interact such that movement of the physical object 202 to which passive object 204 is attached or associated is dynamically tracked as a virtual representation in a simulation experience generated by simulation device 206. The dynamic tracking is based on the changing location profile. In some embodiments, a first location of passive object 204 may have a first location profile and a second location of passive object 204 may have a second location profile. Depending on the frame rate of camera 205, the rate at which the location profile updates, and accordingly, the rate at which the virtual representation is dynamically tracked, may change. The resolution of camera 205, the portion of passive object 204 captured by camera 205, and/or other factors may affect updating location of virtual representation of physical object 202 to which passive object 204 is attached.

At operation 106, the virtual representation is presented in the simulation experience. The simulation experience may be presented on a presentation output device 210. In some embodiments, presentation output device 210 may include at least one of display 208 for presenting visual aspects of the simulation experience, and one or more speakers 209 through which audio aspects of the simulation experience may be presented.

Display 208 may provide a simulation experience through visual information presented thereon. Visual information may include information that may be observed visually, such as an image, video, and/or other visual information. Display 208 may be included in or be embodied as one or more of an HMD 410 (see FIG. 4), an HMD in which simulation device 206 (or alternatively, presentation device 210) may be integrated, a see-through display, an optical see-through display, a video see-through display, a visor, eyeglasses, sunglasses, a computer, a laptop, a smartphone, a tablet, a mobile device, a projector, a monitor, a TV, and/or other displays.

In some implementations, display 208 may include a motion, position, and/or orientation tracking component, in addition to camera 205, so that the visual information presented on display 208 changes as the position and/or orientation of display 208 and the user changes. Display 208 may be configured to display a simulation experience using AR, VR, or other simulation presentation technology. For example, display 208 may visually provide the simulation experience by displaying an overlay image over one or more of an image, a video, and/or other visual information so that one or more parts of real-world objects appear to be augmented by one or more parts of virtual-world objects. In some implementations, display 208 may use AR or VR technology to display a simulation experience by using systems and methods described in U.S. patent application Ser. No. 14/966,754, entitled "SYSTEMS AND METHODS FOR AUGMENTING AN APPEARANCE OF AN ACTUAL VEHICLE COMPONENT WITH A VIRTUAL VEHICLE COMPONENT," filed Dec. 11, 2015, the foregoing being incorporated herein by reference in its entirety. Other systems and methods of providing a simulation experience are contemplated.

Speaker 209 may provide a simulation experience through audio information generated by speaker 209. Audio information may include information that may be observed audibly. Audio information may include one or more of sound, vibration, and/or other audio information associated with the simulation experience and/or virtual representation of physical object 202, such as the sound of a laser blast. Speaker 209 may include one or more of a headphone, an earphone, a headset, an earset, and/or other speakers. In some implementations, speaker 209 may include a speaker associated with display 208.

Figure 2B:
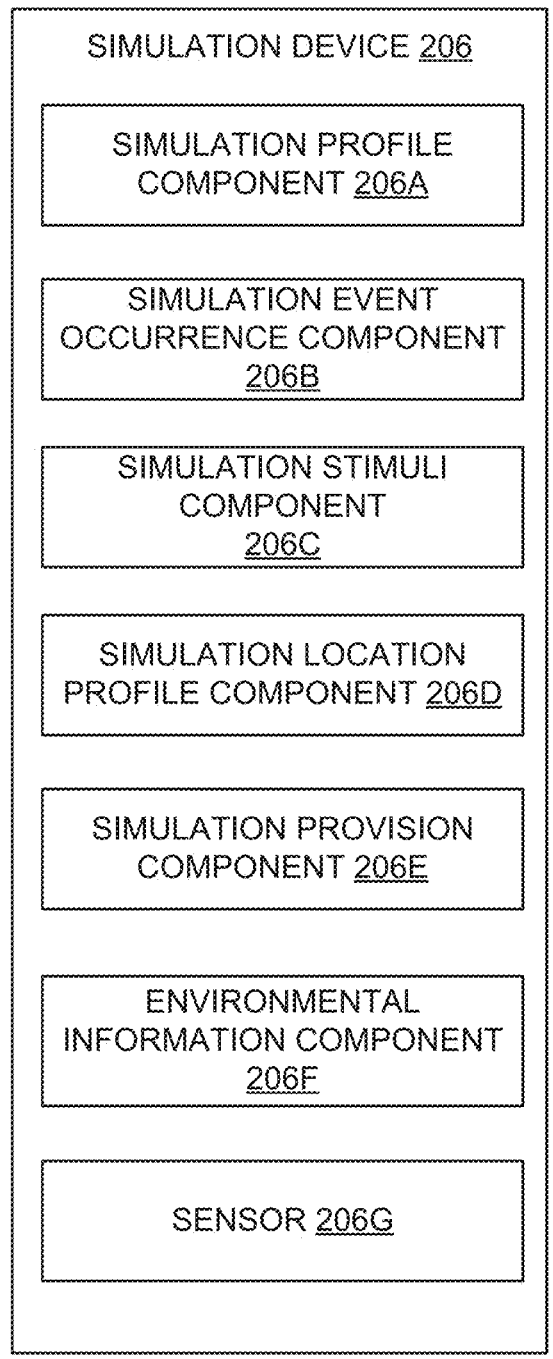
FIG. 2B illustrates example components of the simulation device elements in the system of FIG. 2A.
Figure 4:
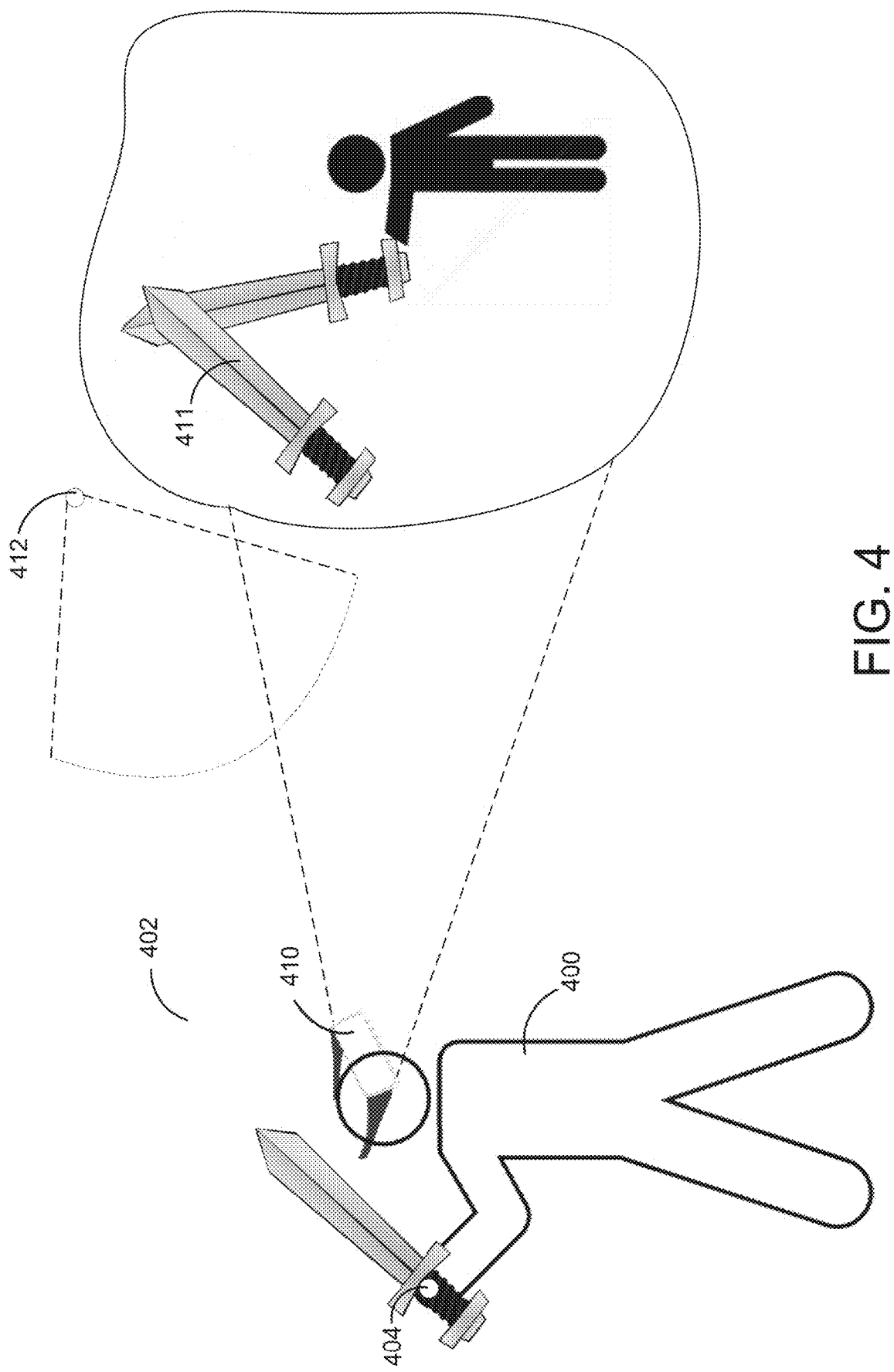
FIG. 4 illustrates an example simulation experience in accordance with one embodiment.

FIG. 2B illustrates example components that may make up simulation device 206. Simulation device 206 may include the following components: a simulation profile component 206A, a simulation event occurrence component 206B, a simulation stimuli component 206C, a simulation location profile component 206D, a simulation provision component 206E, an environmental information component 206F, and at least one sensor 206G. It should be noted that not all of the aforementioned components are necessarily needed, and other components, such as local memory, processors, communication components, user interface components, etc. (some of which are depicted in FIG. 4) may be present.

Referring to simulation device 206, the profiles associated with one or more marks on passive object 204 (or information therein) may be received or obtained by a simulation profile component 206A. Simulation profile component 206A may obtain the profile from a local memory unit, buffer, or cache. Simulation profile component 206A may download or otherwise retrieve a profile from one or more data stores that may be remotely located. It should be noted that the content of a profile may differ depending on the mark associated with the profile. Some profiles may simply include information indicating a type of virtual object, whereas some profiles may additionally include information indicating color, weight, length, height, or any other characteristic that may be relevant in generating a simulation experience. In some embodiments, only information regarding one or more particular characteristics may be received or obtained by simulation device 206 rather than the entire profile. The user may alter or update one or more of the profiles received by simulation profile component 206A. For example, the user may wish to customize aesthetic aspects to be represented in the simulation environment, such as a color of a virtual representation of physical object 202, different material, branding, adding or subtracting graphics, etc. that may become available based on the mark. The user may wish to adjust certain characteristics so that the user can determine how changes to the one or more characteristics may affect the performance of passive object 204 attached to physical object 202 in the simulation environment.

Simulation event occurrence component 206B is configured to receive and/or generate event occurrence information. Simulation event occurrence component 206B may be configured to identify occurrences of simulation events within the simulation experience based on use of physical object 202, but from the perspective of simulation device 206 and/or environmental information component 206G. Simulation event occurrence component 206B may identify occurrences of simulation events based upon information received at environmental information component 206G or communicate with simulation event occurrence component 206B. A simulation event may refer to one or more of specific motions, specific actions, specific sounds, specific locations, specific surroundings, and/or other specific conditions relating to physical object 202, the user of physical object 202, and/or the contextual premise of the simulation experience. Occurrences of simulation events may be identified based on one or more of motion information, activity information, and environment information. Simulation event occurrence component 206B may be configured to identify an occurrence of a simulation event when one or more of motion information, activity information, and/or environment information indicates an occurrence of one or more of specific motions, specific actions, specific sounds, specific locations, specific surroundings, and/or other specific conditions relating to physical object 202 and/or the user of physical object 202 that corresponds to a specific simulation event.

Simulation stimulation component 206C of simulation device 206 may be configured to receive and/or generate simulation stimuli that correspond to simulation events for which occurrences are identified. A simulation stimulus may refer to one or more of a visual, an audio, a haptic and/or other simulation that may change a simulation experience. Simulation stimuli component 206C may also receive instructions to generate simulation stimuli local to the user and physical object 202. Simulation stimulation component 206C may include one or more stimuli output components (not shown), such as LED lights, one or more speakers, etc. Information for instructing simulation stimulation component 206C to generate stimuli may be received.

Simulation device 206 may access simulation location profile component 206D to determine a location profile based on the received content or location profile. In embodiments, simulation device 206 and/or server system 214 may receive content (e.g., video or images) and process the content reflected off passive object 204 to generate a location profile. The location profile may include one or more vectors, such as, for example, a Rodrigues' vector, from the center of passive object 204 to the center of the one or more detected objects that are reflected off passive object 204. The location profile may be used to determine a location and orientation of passive object 204 in the simulation environment.

Simulation events obtained from simulation event occurrence component 206B may be communicated to simulation provision component 206E. Simulation provision component 206E may be configured to provide a simulated experience by operating simulation device presentation output device 220. The simulation experience can be achieved through one or more of visual, audio, haptic and/or other simulations, where the visual, audio, haptic, and/or other simulation changes responsive to simulation event occurrences and simulation stimuli. The simulation event occurrences and/or simulation stimuli may be based on the profile associated with a mark of physical object 202.

Environmental information component 206F may be configured to obtain or receive information regarding the surrounding actions, elements, or other relevant factors or aspects of the surrounding environment that may impact or be affected by the use of the passive object 204 attached to physical object 202. Without limitation, environmental information may include motion, action, sound, location, surroundings, and/or other information relating to physical object 202 with attached passive object 204 and/or a person using physical object 202. Environmental information may be obtained or received from output signals generated by sensor 206G. However, such environmental information is obtained at, or from, the perspective of simulation device 206. In some embodiments, environmental information component 206F may be used to obtain all relevant information regarding the surrounding actions, elements, and/or other relevant factors and/or aspects of the surrounding environment that may impact or be affected by the use of physical object 202.

Sensor 206G may include one or more of image sensors, audio sensors, temperature sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, engine control component sensors, and/or other sensors. In some embodiments, sensors may further include cameras, a tracking marker, a microphone, or any other component that captures environmental information. In some embodiments, sensor 206G may be worn by a user. In some embodiments, sensor 206G may be installed in simulation device 206 or otherwise coupled to simulation device 206. It should be noted that although only one sensor 206G is illustrated, various embodiments contemplate the use of more than one sensor or some combination of the aforementioned sensors.

Figure 3:
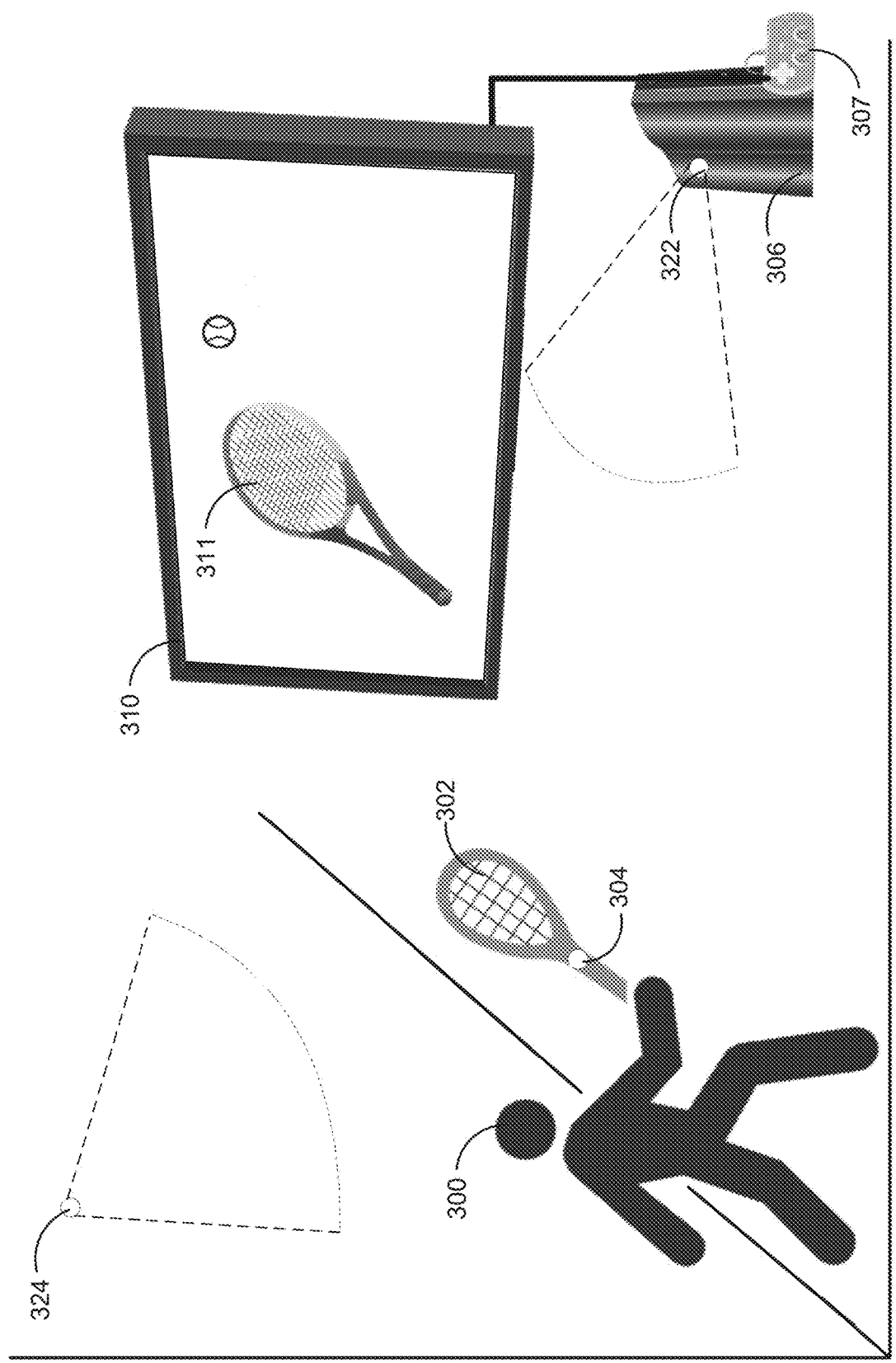
FIG. 3 illustrates an example simulation experience in accordance with one embodiment.

FIG. 3 illustrates an example simulation experience with a physical object provided to a user in accordance with various embodiments. A user 300 may wish to engage in a simulation experience, such as through a computer game or AR/VR experience utilizing physical object 302, i.e., a real-world racquet. The simulation experience may be provided by a gaming console 306 in which a simulation device may be embodied. Physical object 302 is distinguished from a conventional paddle controller 307 usually associated with gaming console 306 for interacting in the simulation experience that includes embedded electronics.

To utilize physical object 302, user 300 may attach a passive object 304 to physical object 302. The manner in which passive object 304 is attached to physical object 302 can vary. In some embodiments, passive object 304 is provided with a reusable adhesive allowing user 300 to attach passive object 304 to physical object 302. In some embodiments, passive object 304 may be configured with one or more attachment mechanisms, such as a Velcro® or buckled strap, a clamp, a magnet, a suction cup, or other attachment mechanism. In some embodiments, passive object 304 may be a spheroid reflective mirror, a mirror, a multi-faceted mirror, or other passive object. It should be appreciated that the shape of a given passive object may offer less reflection of the environment than the shape of another given passive object.

FIG. 3 illustrates two cameras 322 and 324. In this embodiment, camera 322 may be implemented at gaming console 306, while camera 324 may be implemented anywhere a user wishes to locate a camera, such as on a room wall. It should be noted that more or less cameras may be utilized in accordance with various embodiments. Although not necessary in all embodiments, multiple cameras can increase the precision of a simulation experience by increasing the amount of data indicative of the movement and/or positioning of passive object 304 attached to physical object 302. Camera 322 or camera 344 may capture a real-world environment surrounding user 300, a portion of passive object 304 attached to physical object 302, user 300, etc. The captured content may be used to derive a location profile of the passive object, as described above. In embodiments, one of camera 322 or 324 may be a tracking marker or tracking sensor picked up by sensors and/or other electronics of gaming console 306 to track conventional controllers (e.g., conventional paddle controller 307).

User 300 may select a profile for physical object 302 through a user interface on gaming console 306. Selection of the profile can occur at any time and need not only occur upon attachment of passive object 304 to physical object 302.

A simulation experience may be initiated via gaming console 306. As illustrated, user 300 may now utilize physical object 302 to participate, interact, control, or otherwise engage in the simulation experience, which may be presented on a presentation output device 310, i.e., a TV. Depending on the profile selected by user 300 and/or any alterations to one or more characteristics based on the profile, the simulation device embodied as, or within, gaming console 306 can generate an accurate representation and experience for user 300. The simulation device may obtain, receive, and/or generate a location profile; obtain, receive and/or generate simulation event occurrence information; obtain, receive and/or generate simulation stimuli; etc. In this way, user 300 can engage in a more accurate simulation experience than can be provided by conventional controller 307.

FIG. 4 illustrates an example simulation experience with a physical object provided to a user in accordance with various embodiments. A user 400 may wish to engage in a simulation experience, such as through a computer game or AR/VR experience utilizing physical object 402, i.e., a real-world sword toy built at an amusement park, that the user has brought home along with an associated passive object 404. The simulation experience may be provided by an HMD 410 in which a simulation device and presentation output device may be embodied.

To utilize physical object 402, user 400 may attach passive object 404 to physical object 402. Camera 412 may be used to capture passive object 404. The content captured by camera 412 may be processed to recognize one or more objects reflected off passive object 404 in a real-world environment and generate positional and orientation vectors from the center of the passive object 404 to the one or more objects. In some embodiments, camera 412 may be integrated into HMD 410. User 400 may select a profile associated with physical object 402 through a user interface on HMD 410. In this embodiment, the profile for physical object 402 may be obtained by establishing a connection to the amusement park server/database which may be an embodiment of server system 214 (see FIG. 2A). In some embodiments, the mark (not shown) on the passive object 404 may update or supplement the profile from server system 214 based on a date, time of day, location, or other factor. The profile may have been created upon user 400 building physical object 402 and a corresponding passive object 404 that has been configured with one or more profiles via a mark. The profile may be stored in the amusement park server/database.

A simulation experience may be initiated via HMD 410. As illustrated, user 400 may now utilize physical object 402 (represented as a virtual sword 411) to participate, interact, control, or otherwise engage in the simulation experience, which may be presented through HMD 410. Depending on the profile selected by user 400, the simulation device embodied as, or within, HMD 410 can generate an accurate representation and experience for user 400. The simulation device 404 may obtain, receive, and/or generate a reflection location profile commensurate with the location profile, exchange simulation event occurrence information to generate simulation stimuli (such as sword sound effects), etc.

It should be noted that user 400 may elect to change one or more profiles associated with physical object 402, such as the color or style, as described in greater detail above. User 400 can change such profiles via a user interface on HMD 410 or via a connected computing device user interface, such as a smart phone application.

It should be further noted that in the context of the simulation experience presented to user 400, user 400 may be given the opportunity to "unlock" and play with other versions of the virtual representation of the physical object, e.g., a virtual sword having different characteristics, such as more power in the simulation experience, a different color in the simulation experience, etc. Unlocking these other versions may be predicated upon user 400 paying an upgrade fee within the simulation experience, which may be an online gaming experience. Accordingly, HMD 410 may be configured with functionality to present a transaction interface and/or connectivity to a service provider so that the user 400 can engage in a transaction to purchase the upgraded or modified version of the virtual representation of physical object.

The functionality described in the present disclosure can also be utilized in the context of performances. For example, a performer may perform in a green screen room to be adapted into a virtual character in the movie. Instead of using expensive laser grid systems or embedded electronics in a body suit, the disclosed technology may be used. One or more passive objects may be attached to a performer (e.g. a passive object on each arm, each leg, the torso, and a head). More passive objects attached to a performer may improve the granularity of a performance (e.g., attaching a passive object to the forearm and the upper arm may be able to distinguish a performer's forearm movement from the upper arm movement).

Figure 5:
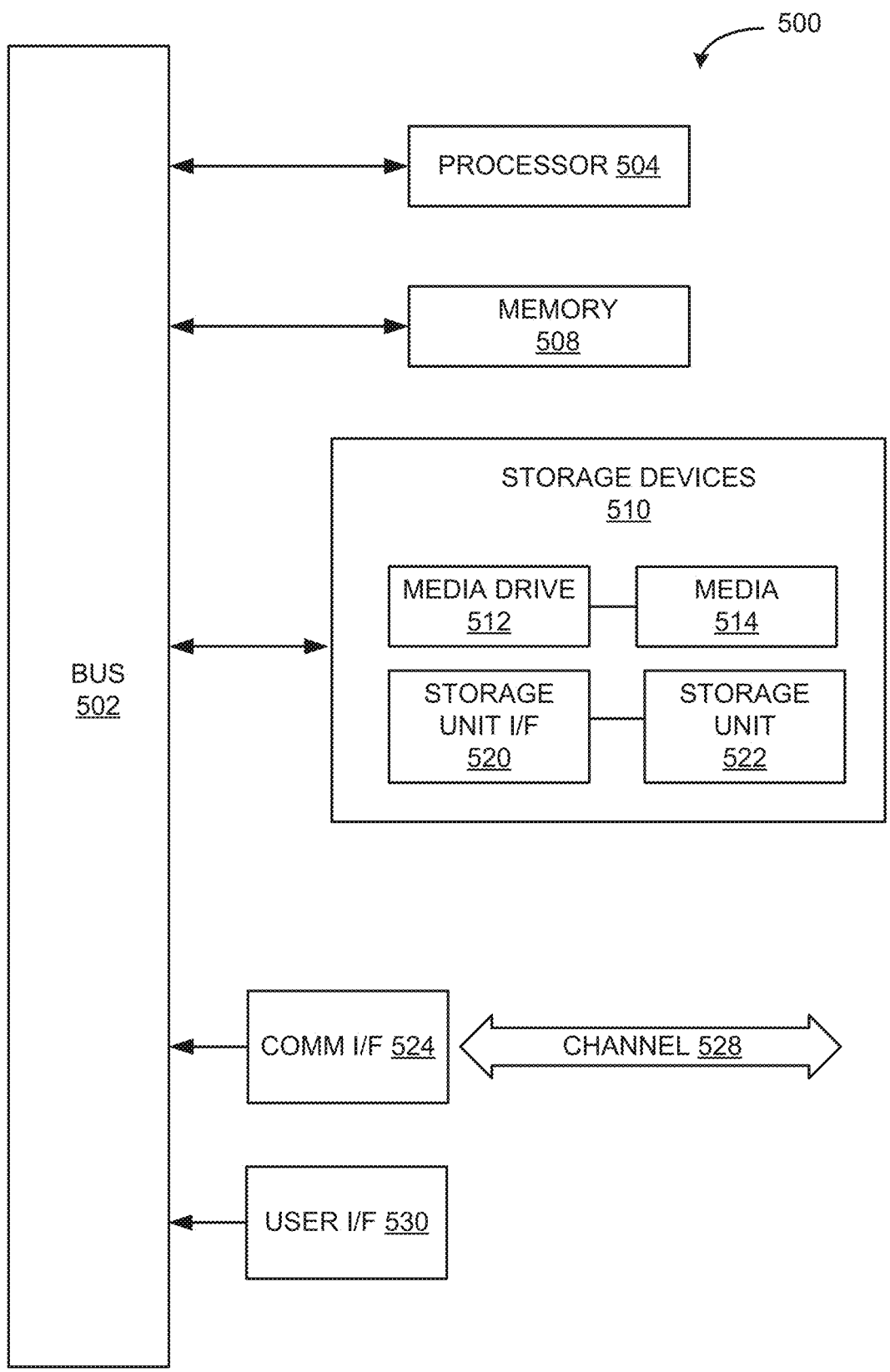
FIG. 5 is an example computing component that may be used to implement various features of embodiments described in the present disclosure.

FIG. 5 illustrates an example computing component that may be used to implement various features of the system and methods disclosed herein, for example, one or more elements of system 200, such as simulation device 206.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete parts or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 5. Various embodiments are described in terms of this example—computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example navigation systems, portable computing devices, VR/AR, HMD, simulation devices, gaming consoles, and other electronic devices that might include some form of processing capability.

Computing component 500 might include, for example, one or more processors, controllers, control components, or other processing devices, such as a processor 504. Processor 504 might be implemented using a general-purpose or special-purpose processing engine such as, for example, a microprocessor, a controller, or other control logic. In the illustrated example, processor 504 is connected to a bus 502, although any communication medium can be used to facilitate interaction with other components of computing component 500 or to communicate externally.

Computing component 500 might also include one or more memory components, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to, or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot, a PCMCIA slot and card, and other fixed or removable storage units 522 and interfaces 520 that allow software and data to be transferred from the storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via channel 528. This channel 528 might carry signals and might be implemented using a wired or wireless communication medium. Some examples of a channel might include a phone line, a cellular link, an RF link, an optical link, a network interface, a local or wide area network, and other wired or wireless communication channels.

Further still, computing component 500 may include a user interface 530. User interface 530 may include a display, a physical input mechanism such as one or more buttons, softkeys, or other actuatable components, or a combination thereof.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the parts or functionality described or claimed as part of the component are all configured in a common package. Indeed, any or all of the various parts of a component, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   obtaining a location profile of a passive object, including:
   capturing, using a first camera, a first image of the passive object having a reflective surface reflecting a real-world object, wherein the passive object is attached to a physical object,
   detecting, in the first image, a reflection of the real-world object reflected in the passive object, and
   generating the location profile of the passive object based on the reflection detected in the first image;

transmitting the location profile to a simulation device, wherein the simulation device comprises a lighting device in a known fixed location in a real-world environment, the lighting device is captured by the first camera as a second reflection reflected in the passive object, and the second reflection is configured to be used in a calibration of the location profile by using the known fixed location of the lighting device;

generating a virtual representation of the physical object based on the location profile of the passive object; and presenting the virtual representation in a simulation experience, wherein the passive object includes an optically capturable mark configured to associate the passive object with a change in the simulation experience, and wherein the change in the simulation experience comprises at least one of a change to the virtual representation of the physical object, an additional simulation experience, an additional simulation event, or a virtual character.

2. The computer-implemented method of claim 1, wherein the optically capturable mark includes a pattern of etched parallel lines.

3. The computer-implemented method of claim 1, wherein the location profile comprises a position and an orientation of the passive object in a real-world environment.

4. The computer-implemented method of claim 1, wherein obtaining the location profile further comprises generating a vector from a center of the passive object to a center of the real-world object.

5. The computer-implemented method of claim 1, wherein the simulation experience comprises at least one of an augmented reality (AR) experience, a virtual reality (VR) experience, a motion capture performance, or a gaming experience.

6. The computer-implemented method of claim 3, further comprising:

obtaining a second location profile of the passive object, wherein the second location profile comprises a second position and a second orientation of the passive object;

transmitting the second location profile to the simulation device; and presenting the virtual representation in a second location in the simulation experience based on the second location profile.

7. A system, comprising:

a first camera; and a simulation device operatively connected to the first camera, the simulation device presenting a virtual representation of a physical object with an attached passive object having a reflective surface, wherein the virtual representation is based on a location profile of the passive object, and the location profile is configured to be generated by:

capturing, using the first camera, a first image of the passive object reflecting a real-world object, detecting, in the first image, a reflection of the real-world object reflected in the passive object, and generating the location profile of the passive object based on the reflection; wherein the simulation device is configured to present a virtual representation of the physical object in a simulation experience, wherein the passive object includes an optically capturable mark configured to associate the passive object with a change in the simulation experience, wherein the change in the simulation experience comprises at least one of a change to the virtual representation of the physical object, an additional simulation experience, an additional simulation event, or a virtual character, and wherein the simulation device comprises a lighting device in a known fixed location in a real-world environment, the lighting device is captured by the first camera as a second reflection reflected in the passive object, and the second reflection is configured to be used in a calibration of the location profile by using the known fixed location of the lighting device.

8. The system of claim 7, wherein the optically capturable mark comprises one or more of a barcode, a QR code, a UPC code, or a serial number.

9. The system of claim 7, wherein the location profile comprises a position and an orientation of the passive object in a real-world environment.

10. The system of claim 7, wherein the optically capturable mark includes a pattern of etched lines.

11. A computer-implemented method, comprising:

capturing, by a first camera, content of a passive object having a reflective surface reflecting a real-world object, the passive object being attached to a physical object;

receiving the content;

generating a location profile of the passive object, the location profile comprising a location and an orientation of the passive object;

generating, with a simulation device, a virtual representation of the physical object in a simulation experience, wherein the simulation device comprises a lighting device in a known fixed location in a real-world environment, the lighting device is captured by the first camera as a second reflection reflected in the passive object, and the second reflection is configured to be used in a calibration of the location profile by using the known fixed location of the lighting device; and presenting the simulation experience with the virtual representation in a virtual location, wherein generating the location profile of the passive object includes detecting the real-world object reflected in the passive object, wherein the passive object includes an optically capturable mark configured to associate the passive object with a change in the simulation experience, and wherein the change in the simulation experience comprises at least one of a change to the virtual representation of the physical object, an additional simulation experience, an additional simulation event, or a virtual character.

12. The computer-implemented method of claim 11, wherein generating the location profile of the passive object includes generating a vector from the passive object to the real-world object.

13. The computer-implemented method of claim 11, wherein detecting the real-world object comprises one or more of centroid detection or corner detection.

14. The computer-implemented method of claim 1, further comprising presenting a transaction interface configured to allow a user to purchase the change in the simulation experience.

15. The computer-implemented method of claim 1, wherein the optically capturable mark is associated with a profile including information indicating a type of virtual representation of the physical object.

16. The computer-implemented method of claim 15, wherein the profile comprises information indicating one of a color, a weight, a length, or a height of the virtual representation of the physical object.

17. The computer-implemented method of claim 1, wherein obtaining the location profile further comprises:
   capturing, using a second camera, a second image of the passive object reflecting the real-world object;
   detecting, in the second image, the reflection of the real-world object reflected in the passive object, and
   generating the location profile of the passive object based on the reflection detected in the first image and the second image.

18. The system of claim 7, further comprising a second camera, wherein one of the first camera or the second camera is a 360 degree camera.

19. The system of claim 18, wherein the 360 degree camera is located above a user.

\* \* \* \* \*